United States Patent Office 3,251,278
Patented May 17, 1966

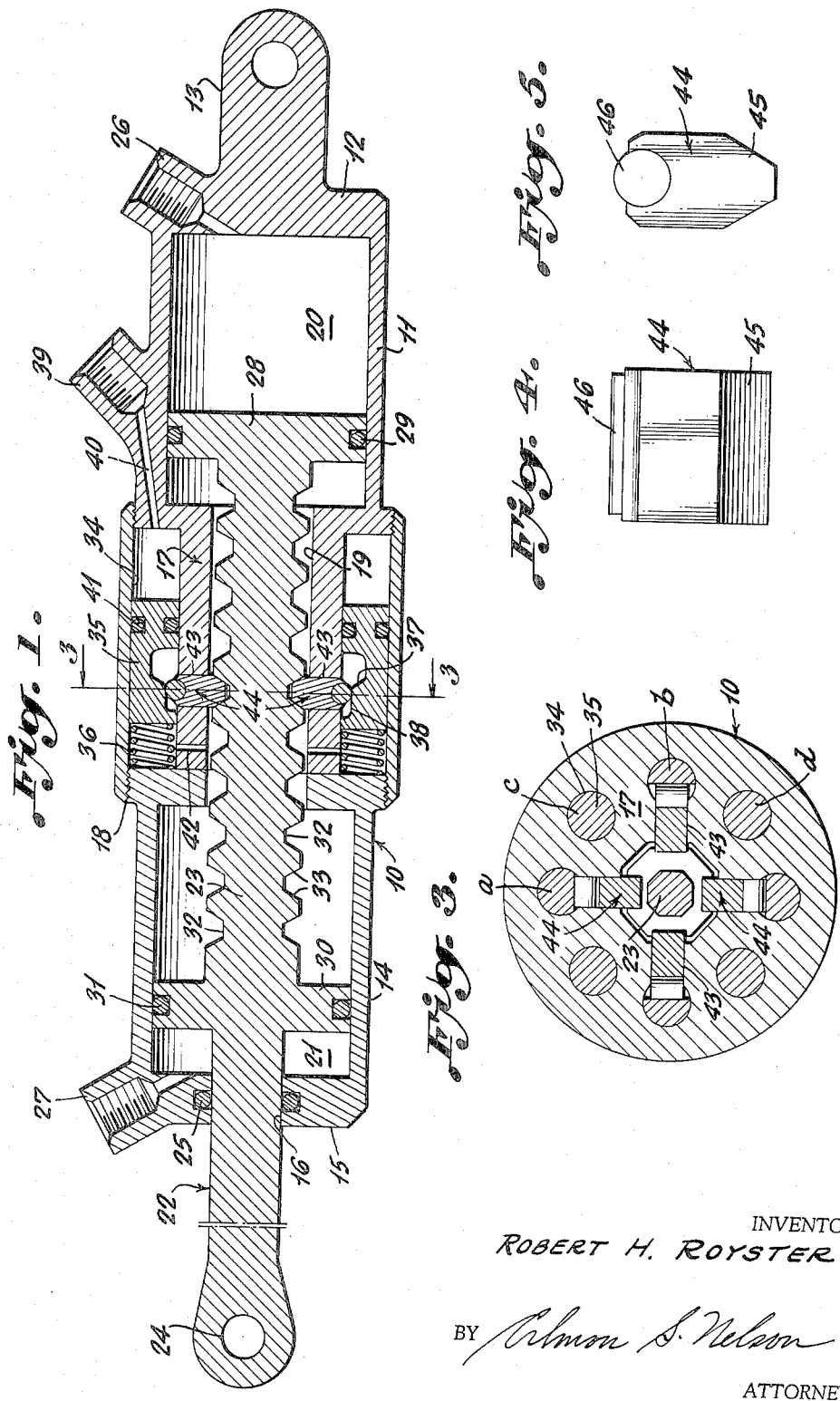

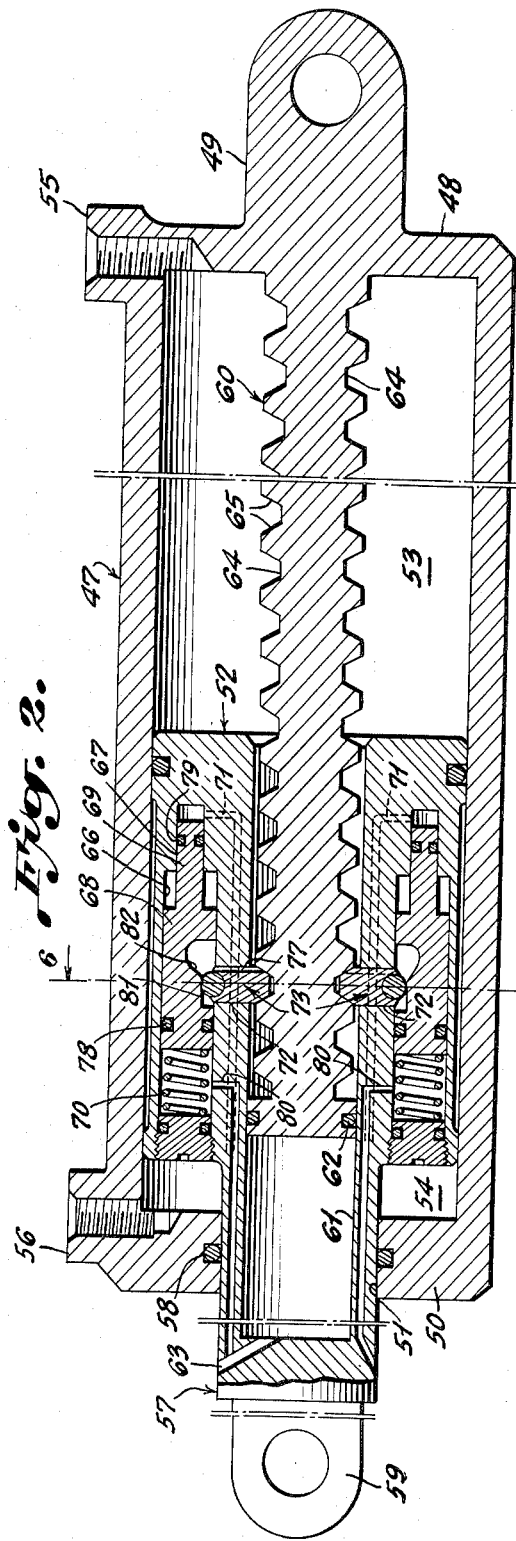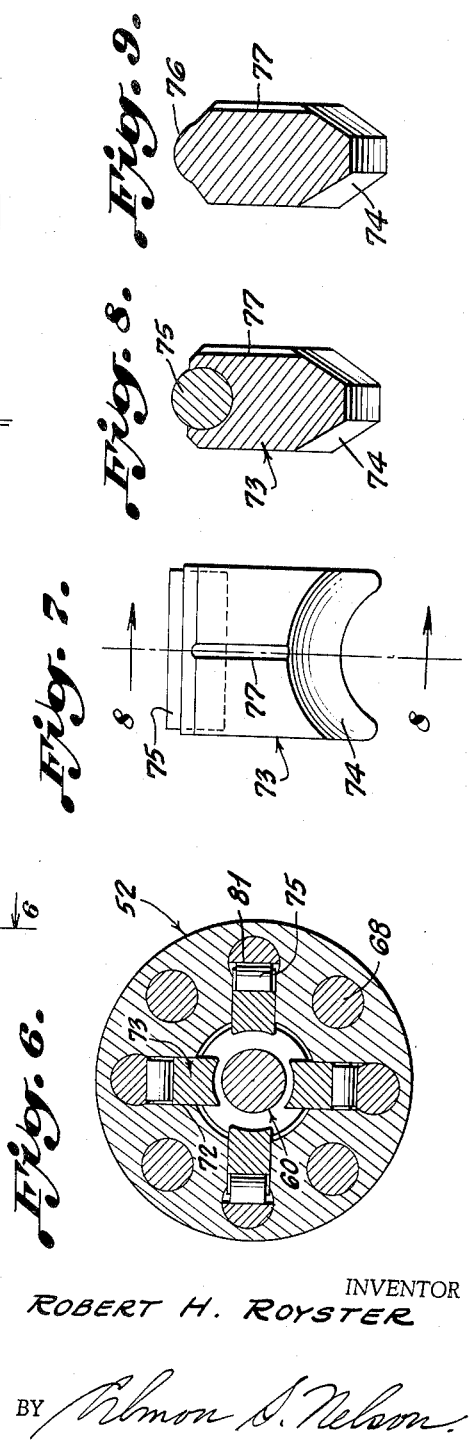
INVENTOR
ROBERT H. ROYSTER
BY
ATTORNEY

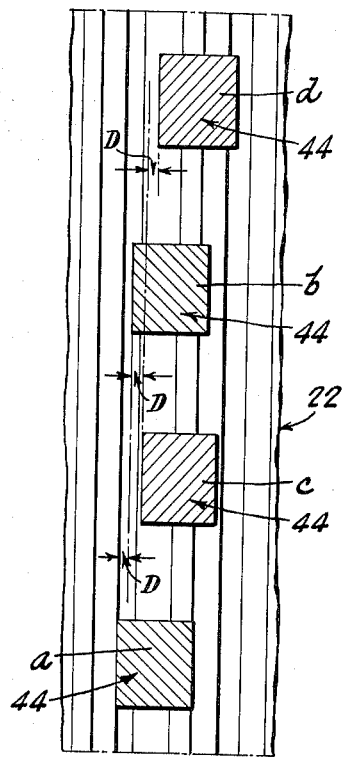
Fig. 10.
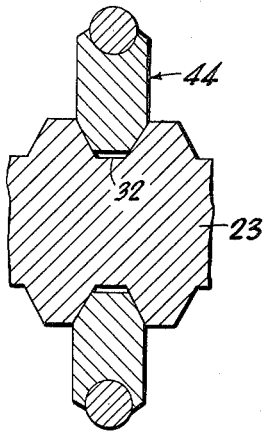
Fig. 11a.
Fig. 11b.
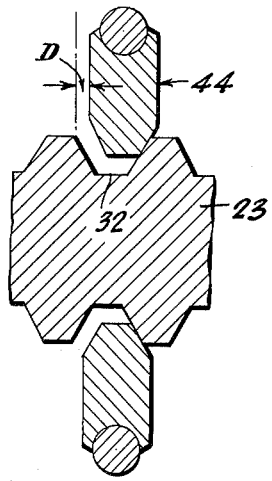
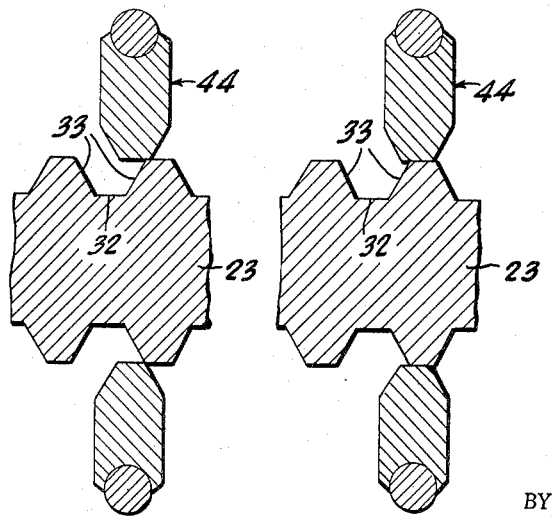
Fig. 11c. Fig. 11d.
INVENTOR
ROBERT H. ROYSTER
BY
ATTORNEY though the prior art devices have operated satisfac-

3,251,278
FLUID PRESSURE ACTUATOR WITH FLUID PRESSURE CONTROLLED LOCKING MEANS
Robert H. Royster, 1436 Serenade Terrace,
Corona del Mar, Calif.
Filed Dec. 16, 1964, Ser. No. 418,599
18 Claims. (Cl. 92—18)

This invention relates to fluid pressure or hydraulically operated mechanisms and more particularly to a fluid pressure actuator and locking means which may be utilized in the landing gear structure of aircraft or for any other application where it is desired to utilize fluid pressure actuated means for moving an element to a desired position and for thereafter locking the element in such position.

Heretofore numerous types of fluid pressure actuators incorporating locking means have been proposed and utilized particularly in connection with the aircraft industry and while these prior art devices have operated satisfactorily insofar as providing a motive force for moving an element from one position to another, the locking means incorporated therein has given considerable trouble, in that in general, such prior art locking means has involved relatively delicate toggle mechanisms and frequent failure thereof has been experienced. Moreover these prior art locking devices incorporated in fluid pressure actuators have been relatively complex and costly to manufacture and furthermore, repair thereof or replacement upon failure has also been relatively costly. Difficulty has also been experienced as the result of wear causing play to develop between the parts of the locking mechanism which has sometimes resulted in failure to provide a positive lock with the result that inadvertent movement of the element operated by the fluid pressure actuator has taken place which, in certain instances, could be disastrous.

The locking means incorporated in prior art fluid pressure actuators of this general type have been of such a nature that relatively small movements of the actuator and subsequent locking of the same in position have not been possible, since the number of points at which the mechanism may be locked have been limited and relatively widely spaced and, therefore, these mechanisms were not usable where relatively small movements or adjustments were necessary.

It is accordingly an object of the invention to provide a fluid pressure actuator and locking means which maybe conveniently and economically constructed from readily available materials and which will provide a positive lock, regardless of wear or play between the parts.

A further object of the invention is the provision of a fluid pressure actuator and locking means in which the locking mechanism is relatively simple and eliminates the use of levers or toggle mechanisms thereby reducing likelihood of failure to a minimum.

A still further object of the invention is the provision of a fluid pressure actuator and locking means in which the entire operation of the device is controlled merely by the admission of fluid pressure thereto.

Another object of the invention is the provision of a fluid pressure actuator and locking means which may be constructed as a double-acting or a single-acting device while still utilizing the same basic actuating and locking mechanisms.

A further object of the invention is the provision of a fluid pressure actuator and locking means in which the locking means includes radially movable locking detents in the form of bolts, the bolts operating in pairs and in which the number of bolts utilized and the construction thereof may be determined in accordance with the size and load requirements of the device while still utilizing the same basic locking mechanism.

A still further object of the invention is the provision of a fluid pressure actuator and locking means in which the locking means includes radial movable locking detents actuated by locking cam means including inclined and flat surfaces in contact with cam follower means, all of the parts being in contact at all times and in compression, thereby providing a particularly strong structure and reducing the likelihood of failure.

Another object of the invention is the provision of a fluid pressure actuator and locking means, including a piston rod movable in a cylinder and with spaced annular grooves in the rod there being radial movable locking detents engageable with the grooves in the rod, such detents operating in pairs and each pair being axially spaced from the next adjacent pair a fraction of the distance between adjacent grooves in the rod thereby permitting locking of the rod in a plurality of positions less than the distance between adjacent grooves to provide for relatively small movements or adjustments of the mechanisms operated by the device of this invention.

Further objects and advantages of the invention will be apparent from the following description taken in conjunction with the accompanying drawings wherein:

FIG. 1 is a longitudinal sectional view showing a fluid pressure actuator and locking means constructed in accordance with this invention;

FIG. 2 is a longitudinal sectional view similar to FIG. 1, but showing a somewhat modified form of fluid pressure actuator and locking means constructed in accordance with this invention;

FIG. 3 a sectional view taken substantially on the line 3—3 of FIG. 1;

FIG. 4 a front elevational view of a locking detent of the type shown in FIG. 1;

FIG. 5 a side elevational view of the locking detent shown in FIG. 4;

FIG. 6 a sectional view taken substantially on the line 6—6 of FIG. 2;

FIG. 7 a front elevational view of the locking detent shown in FIG. 2;

FIG. 8 a sectional view taken substantially on the line 8—8 of FIG. 7;

FIG. 9 a sectional view of another form of locking detent;

FIG. 10 a development showing the relationship between the locking detents and the grooves in the rod engaged by the detents;

FIG. 11a a fragmentary sectional view showing the full engagement of one pair of detents with a groove in the rod;

FIG. 11b a sectional view similar to FIG. 11a and showing the partial engagement of one pair of detents with a groove in the rod;

FIG. 11c a sectional view showing the relative position between another pair of detents and a groove in the rod; and FIG. 11d a sectional view showing the relative position of still another pair of detents with respect to the groove in the rod.

With continued reference to the drawings and particularly FIGS. 1, 3, 4 and 5, there is shown a fluid pressure actuator and locking means constructed in accordance with this invention and which comprises an elongated tubular body 10 which, for convenience, may be made in two parts, the part 11 having an end wall 12 closing the same and on which an ear 13 or other suitable means may be provided for attaching the body 10 to a supporting structure. The other part 14 of the body 10 is provided with an end wall 15 having an opening 16 therein.

The part 11 of the body 10 may be provided with an inwardly extending elongated annular boss 17 and the part 11 may be secured to the part 14 by suitable screw threaded means 18 or in any other desired manner. The annular boss 17 as clearly shown in FIG. 1 is disposed intermediate the length of the body 10 and the boss 17 is provided with an axial aperture 19 extending therethrough and the boss 17 also serves to divide the body 10 into spaced cylinders 20 and 21.

A piston rod 22 is slidably received in the opening 16 in the end wall 15 of the part 14 of the body 10 and a portion 23 of the piston rod 22 disposed within the body 10 is slidably received in the axial aperture 19 in the annular boss 17. The piston rod 22 may be provided with an eye 24 at the outer end thereof for attaching the piston rod to a mechanism to be actuated by the device of this invention. Suitable sealing means 25 may be provided for preventing the escape of fluid pressure from the cylinder 21 through the opening 16 around the piston rod 22.

A fluid pressure inlet and outlet 26 is provided for the cylinder 20 and a similar fluid pressure inlet and outlet 27 is provided for the cylinder 21. A piston 28 is provided on the inner end of the piston rod 22 and the piston 28 is slidably received in the cylinder 20 and may be provided with suitable conventional packing means 29. A second piston 30 is provided on the piston rod 22 and is slidably received in the cylinder 21 with suitable conventional packing means 31 being provided on the piston 30. The portion 23 of the piston rod 22 between the pistons 28 and 30 is provided with a plurality of spaced annular grooves 32 and the walls 33 of each groove 32 are beveled outwardly to provide cam surfaces. As shown in FIGS. 1 and 3, the portion 23 of the piston rod 22 between the pistons 28 and 30 is octagonal in cross section, but this cross section may be circular or may be polygonal with any desired number of sides depending upon the particular requirements.

A plurality of circumferentially spaced longitudinal bores 34 are provided in the annular boss 17 and a plunger 35 is slidably received in each bore. A compression spring 36 is provided in one end of each bore 34 for urging the associated plunger 35 toward the opposite end of the bore. Each plunger 35 is provided with cam means 37 thereon for a purpose to be presently described and each cam means 37 merges into a flat surface 38. A common fluid pressure inlet and outlet 39 communicates through passages 40 with the bores 34 and each plunger 35 is provided with suitable conventional sealing means 41, to prevent flow of fluid pressure around the plungers 35, but in the event there is any leakage of fluid pressure and in order to prevent any increase in pressure in the ends of the bores 34 containing the compression springs 36, such ends may be vented by suitable vent passages 42 communicating with the axial aperture 19 in the boss 17.

Circumferentially spaced radial apertures 43 are provided in the boss 17 and such apertures communicate with the bores 34 and with the axial aperture 19 extending through the boss 17. A locking detent 44 is slidably received in each radial aperture 43 and as clearly shown in FIGS. 1 and 5, the inner ends 45 of the detents 44 are tapered to facilitate engagement in the grooves 32 of the portion 23 of the piston rod 22. The outer end of each locking detent 44 is provided with cam follower means in the form of a roller 46, but if desired, such cam follower means may be in the form of a rounded nose portion on the outer end of each detent. As clearly shown in FIG. 1, the cam follower means 46 is adapted to engage the cam surface 37 or the flat surface 38 on the plungers 35.

Diametrically opposite locking detents 44 provide operating pairs and as best shown as a development in FIG. 10, the pairs of detents are axially spaced a fraction of the distance between the adjacent grooves 32 in the piston rod 22. For simplicity of illustration, FIG. 10 only shows a single detent of each operating pair and as shown therein, the detent 44 at $a$ is fully engaged in the groove 32 and such full engagement is also shown in FIG. 11$a$. As shown at $b$ in FIG. 10 and in FIG. 11$b$, the next detent 44 is partially engaged with the groove 32 and the distance D represents the axial spacing between pairs of detents and also represents the distance between locking points for the device of this invention. In a similar manner, the locking detent 44 shown at $c$ in FIG. 10 and in FIG. 11$c$ engages a portion of the surface between adjacent grooves 32 and the locking detent 44 shown at $d$ in FIG. 10 and in FIG. 11$d$ is substantially in alignment with the surface between adjacent grooves 32. There is thus shown the manner in which the locking mechanism of this invention provides relatively great resolution of adjustment, or in other words, permits relatively fine adjustment of the mechanism while locking the same in each adjusted position.

The compression springs 36 serve to urge all of the plungers 35 toward the right, as viewed in FIG. 1, and this will result in urging all of the locking detents 44 inwardly with one pair of such detents fully engaging in the grooves 32 of the piston rod 22 and with the other detents partially engaging such grooves or the surface between the grooves as described above. When it is desired to operate the device fluid pressure is introduced through the inlet 39 into the bores 34 which result in urging all of the plungers 35 toward the left, as viewed in FIG. 1, thereby disengaging the flat surfaces 38 and cam surfaces 37 on the plungers 35 from the cam follower means 46 on the detents 44 and thereafter, fluid pressure may be introduced through the inlet 26 to the cylinder 20 or through the inlet 27 to the cylinder 21 which results in moving the piston rod 22 in one direction or the other and the beveled surfaces 33 of the grooves 32 serve to cam the locking detents 44 outwardly thereby permitting movement of the piston rod 22. When the piston rod 22 has reached the desired position, fluid pressure is released from the bores 34 thereby permitting the plungers 35 to be urged toward the right, as viewed in FIG. 1 by the springs 3 which will result in engaging the cam surfaces 37 on the plungers 35 with the cam follower means 46 on the detents 44, thereby moving such detents inwardly with one pair thereof fully engaging in the appropriate groove 32 in the piston rod 22 to thereby lock such piston rod in adjusted position. Since the cam follower means 46 on the pair of detents 44 fully engaging in the groove 32 will engage the flat surfaces 38 on the associated plungers 35, thereby locking such detents in inward position against any movement outwardly resulting from axial force on the piston rod 22 and the detents cannot move outwardly until the plungers 35 move toward the left as viewed in FIG. 1 to release the cam follower means 46 from the flat surfaces 38 on the plungers 35.

It will thus be seen that by this form of the invention there has been provided a fluid pressure actuator and locking means in which almost infinite adjustment may be provided, in that only a single pair of locking detents fully engages in a groove in the piston rod and the distance between adjusted position may be made substantially any fraction of the distance between adjacent grooves in the piston rod thereby providing relatively great resolution or degree of adjustment.

With particular reference to FIG. 2, there is shown a somewhat modified form of fluid pressure actuator and locking means constructed in accordance with this invention and which comprises an elongated tubular body 47 having an end wall 48 closing one end and provided with an ear 49 for attaching the body 47 to a supporting structure and with the opposite end of the body 47 provided with a wall 50 having an opening 51 therein.

The body 47 serves to provide a cylinder and slidably disposed in such cylinder is an elongated hollow piston 52 which serves to divide the cylinder into two chambers 53 and 54. A fluid pressure inlet and outlet 55 communicates with the chamber 53 and a fluid pressure inlet and outlet 56 communicates with the chamber 54. A hollow piston rod 57 closed at the outer end is fixed to the piston 52 and the piston rod 57 extends through and is slidably received in the opening 51 in the end wall 50 of the body 47 with suitable conventional packing means 58 being provided for preventing the escape of fluid pressure from the chamber 54 through the opening 51 and around the piston rod 57. The piston rod 57 may be provided on the outer end with an eye 59 for attaching the same to a mechanism to be operated by the device of this invention.

A locking bar 60 is fixed to the closed end wall 48 of the body 47 and the locking bar 60 extends into the bore 61 of the hollow piston 52 and piston rod 57 and the locking rod 60 may be provided with suitable conventional packing means 62 engaging the wall of the bore 61 to prevent the leakage of fluid pressure from the chamber 53 into the bore 61. However, if there is any leakage into the bore 61 and also in order to ensure that the closed end of the bore is at atmospheric pressure, a vent passage 63 may be provided in the closed end of the piston rod 57 to provide communication between the bore 61 and the atmosphere. The locking bar 60 may be provided with a plurality of spaced annular grooves 64 with the walls 65 of the grooves 64 beveled outwardly to provide cam surfaces. The locking bar 60 may be circular in cross section, as shown in FIGS. 2 and 6, or may be polygonal with any desired number of sides similar to the structure shown for the piston rod 22 of FIG. 1.

Piston 52 is provided with a plurality of circumferentially spaced longitudinal bores 66 and each bore 66 terminates at the inner end in a reduced bore 67. A plunger 68 is slidably received in each bore and each plunger 68 is provided with a reduced portion 69 slidably received in each reduced bore 67. A compression spring 70 is disposed in each bore 66 at the end opposite the reduced bore 67 and the springs 70 serve to urge the plungers 68 toward the reduced bores 67 or toward the right as viewed in FIG. 2. A passage 71 is provided in the piston 52 and such passage communicates with each reduced bore 67 adjacent the end thereof and with the chamber 54 in the body 47.

Circumferentially spaced radial apertures 72 are provided in the piston 52, such apertures communicating with each bore 66 and with the bore 61 in the hollow piston 52. A locking detent 73 is slidably received in each radial aperture 72 and the inner ends 74 of the detents 73 are tapered for engaging in the grooves 64 of the locking bar 60. The outer ends of the detents 73 may be provided with cam follower means in the form of a roller 75 as shown in FIG. 8, or a solid rounded nose portion 76 as shown in FIG. 9. Each detent 73 is provided with a groove 77 in one surface which serves to provide a communication between each bore 66 and the bore 61 in the piston 52 and piston rod 57. The plungers 68 may be provided with suitable conventional packing means 78 engaging the walls of the bores 66 to prevent the leakage of fluid pressure and in a similar manner, the reduced plunger portions 69 may be provided with suitable conventional packing means 79 for engaging the walls of the reduced bores 67 to prevent the leakage of fluid pressure. Vent passage 80 may be provided communicating with the ends of the bores 66 opposite the reduced bores 67 and with the chamber 54.

Diametrically opposite detents 73 provide operating pairs and such pairs of detents are axially spaced a fraction of the distance between the grooves 64 in the locking bar 60 in the same manner as described above in connection with the form of the invention shown in FIG. 1 and the detents 73 will fully engage and partially engage in the grooves 64 with other pairs engaging the surface of the locking bar 60 between the grooves 64 as described above in connection with FIGS. 10 and 11a to 11d, in other words the operation of the locking detents in the form of the invention shown in FIG. 2, is exactly the same as for the form of the invention shown in FIG. 1.

The springs 70 will urge all of the plungers 68 toward the right, as viewed in FIG. 2 and this will result in the flat surfaces 81 on the plungers 68 engaging the cam follower means 75 on the locking detents 73 to lock such detents in engagement with the adjacent groove 64 in the locking bar 60. The cam follower means 75 on the other locking detents will engage the cam surfaces 82 on the plungers 68, which cam surfaces 82 merge into the flat surfaces 81.

When it is desired to move the piston 52 and piston rod 57 toward the left, as viewed in FIG. 2, fluid pressure is introduced into the chamber 53 which results in exerting a force toward the left on the piston 52 and at the same time, such fluid pressure will flow into the bore 61 in the piston 52 around the locking bar 60 and through the grooves 77 into the bores 66 which will result in moving the plungers 68 toward the left, as viewed in FIG. 2, to disengage the flat surfaces 81 from the cam follower means 75 on the locking detents 73 and thereupon the piston 52 and piston rod 57 will move toward the left with the beveled surfaces 65 of the grooves 64 camming the locking detents 73 outwardly until the desired point of travel of the piston 52 is reached. At this time, fluid pressure is released from the chamber 53 and as a consequence thereof, the springs 70 urge the plungers 68 toward the right to cam the locking detents 73 as viewed in FIG. 2, to cam the locking detents 73 inwardly with the appropriate pair of such detents fully engaging in a groove 64 to lock the piston 52 in such position and with the other locking detents partially engaging or being disengaged from the grooves 64 as described above in connection with the operation of the form of the invention shown in FIG. 1.

When it is desired to move the piston 52 and piston rod 57 toward the right, as viewed in FIG. 2, fluid pressure is introduced through the inlet 56 into the chamber 54 which exerts a pressure toward the right on the piston 52 and at the same time, such fluid pressure flows through the passages 71 into the reduced bores 67 thereby exerting a force on the plungers 68 to move the same toward the left, as viewed in FIG. 2, thereby releasing the locking detents 73 and permitting outward movement thereof in the same manner as described above in connection with movement of the piston 52 in the opposite direction. Upon completion of the movement of the piston 52 toward the right, as viewed in FIG. 2, fluid pressure is released from the chamber 54 and, therefore, released from the reduced bores 67 with the result that the springs 70 urge the plungers 68 toward the right to again cam the appropriate locking detents into engagement with the appropriate groove 64 in the locking bar 60 to lock the piston 52 and piston rod 57 in adjusted position.

It will, therefore, be seen that with the form of the invention shown in FIG. 2, it is not necessary to provide a separate fluid pressure inlet and outlet for actuating the locking means, such actuation being accomplished by the same fluid pressure inlets and outlets which are utilized to move the piston in either direction.

It will be seen that by the above described invention there has been provided a relatively simple, yet highly effective and dependable fluid pressure actuator and locking means in which a substantially infinite number of locking positions may be provided thereby affording relatively great resolution and permitting use of the device in situations where relatively fine adjustments are required. Furthermore, the structure permits a certain and secure locking function and at the same time, provides for automatic release of the lock without danger of sticking or other malfunction and also all of the mechanism may be accommodated in a relatively small space while still providing ample strength.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A double-acting fluid pressure actuator and locking means comprising an elongated tubular body closed at one end and having an opening in the opposite end, means on said body for attaching the same to a supporting structure, an inwardly extending elongated annular boss intermediate the length of said body having an axial aperture therethrough and dividing said body into spaced cylinders, a piston rod slidably received in said opening and aperture, a piston slidably disposed in each cylinder and fixed to said rod, sealing means to prevent the escape of fluid pressure through said opening, a fluid pressure inlet and outlet into the first cylinder at said one end of said body, a second fluid pressure inlet and outlet into the second cylinder at said opposite end of said body, said rod between said pistons having a plurality of axially spaced annular grooves therein, the walls of said grooves being beveled outwardly to provide cam surfaces, a plurality of circumferentially spaced longitudinal bores in said boss, a plunger slidably received in each bore, a compression spring in each bore at one end for urging said plungers toward the opposite end, cam means on each plunger, a common fluid pressure inlet and outlet communicating with each bore at the ends opposite said springs, circumferentially spaced radial apertures in said boss communicating with each bore and with said axial aperture, a locking detent slidably received in each radial aperture, the inner ends of said detents being tapered for engaging said grooves and the outer ends of said detents having follower means engaging said cam means, diametrically opposite plungers and associated detents providing operating pairs, each pair of detents being axially spaced from the next circumferentially adjacent pair a distance equal to a fraction of the distance between two axially adjacent grooves, whereby said springs will urge all of said plungers in one direction to cause said cam means to urge said detents inwardly, one pair of detents engaging a groove to lock said rod against movement in either direction with certain of the remaining pairs of detents partially engaging said last mentioned groove and the remaining pairs of detents engaging said rod between said grooves, introduction of fluid pressure to said bores serving to move said cam means away from said detents and introduction of fluid pressure to either cylinder causing movement of said piston and rod with the cam surfaces in said grooves camming said detents out of locking engagement therewith.

2. A double-acting fluid pressure actuator and locking meas as defined in claim 1, in which said follower means comprises a roller.

3. A double-acting fluid pressure actuator and locking means as defined in claim 1, in which said follower means comprises a rounded nose on the outer end of each detent.

4. A double-acting fluid pressure actuator and locking means, as defined in claim 1, in which said boss is provided with vent passages, said vent pasages communicating with said bores at said one end and with said axial aperture.

5. A double-acting fluid pressure actuator and locking means as defined in claim 1, in which said piston rod between said pistons is polygonal in cross section.

6. A double-acting fluid pressure actuator and locking means as defined in claim 1, in which said piston rod between said pistons is circular in cross section.

7. A double-acting fluid pressure actuator and locking means comprising an elongated tubular body closed at one end and having an opening in the opposite end, means on said body for attaching the same to a supporting structure, an inwardly extending elongated annular boss intermediate the length of said body having an axial aperture therethrough and dividing said body into spaced cylinders, a piston rod slidably received in said opening and aperture, a piston slidably disposed in each cylinder and fixed to said rod, sealing means to prevent the escape of fluid pressure through said opening, a fluid pressure inlet and outlet into the first cylinder at said one end of said body, a second fluid pressure inlet and outlet into the second cylinder at said opposite end of said body, said rod between said pistons having a plurality of axially spaced annular grooves therein, the walls of said grooves being beveled outwardly to provide cam surfaces, a plurality of circumferentially spaced longitudinal bores in said boss, a plunger slidably received in each bore, means in each bore at one end for urging said plunger toward the opposite end, cam means on each plunger, a common fluid pressure inlet and outlet communicating with each bore at the ends opposite said one end, circumferentially spaced radial apertures in said boss communicating with each bore and with said axial aperture, a locking detent slidably received in each radial aperture, the inner ends of said detents being tapered for engaging said grooves and the outer ends of said tapered for engaging said grooves and the outer ends of said detents having follower means engaging said cam means, diametrically opposite plungers and associated detents providing operating pairs, each pair of detents being axially spaced from the next circumferentially adjacent pair a distance equal to a fraction of the distance between two axially adjacent grooves, whereby said means in each bore will urge all of said plungers in one direction to cause said cam means to urge said detents inwardly, one pair of detents engaging a groove to lock said rod against movement in either direction with certain of the remaining pairs of detents partially engaging said last mentioned grooves and the remaining pairs of detents engaging said rod between said grooves, introduction of fluid pressure to said bores serving to move said cam means away from the said detents and introduction of fluid pressure to either cylinder causing movement of said pistons and rod with the cam surfaces in said grooves camming said detents out of locking engagement therewith.

8. A double-acting fluid pressure actuator and locking means comprising an elongated tubular body closed at one end and having an opening in the opposite end, means on said body for attaching the same to a supporting structure, an inwardly extending elongated annular boss intermediate the length of said body having an axial aperture therethrough and dividing said body into spaced cylinders, a piston rod slidably received in said opening and aperture, a piston slidably disposed in each cylinder and fixed to said rod, sealing means to prevent the escape of fluid pressure through said opening, a fluid pressure inlet and outlet into the first cylinder at said one end of said body, a second fluid pressure inlet and outlet into the second cylinder at said opposite end of said body, said rod between said pistons having a plurality of axially spaced annular grooves therein, the walls of said grooves being beveled outwardly to provide cam surfaces, a plurality of circumferentially spaced longitudinal bores in said boss, a plungers slidably received in each bore, means in each bore at one end for urging said plungers toward the opposite end, cam means on each plunger, a common fluid pressure inlet and outlet communicating with each bore at the end opposite said one end, circumferentially spaced radial apertures in said boss communicating with each bore and with said axial aperture, a locking detent slidably received in each radial aperture, the inner ends of said detents being tapered for engaging said grooves and the outer ends of said detents having follower means engaging said cam means, diametrically opposite plungers and associated detents providing operating pairs, each pair of detents being axially spaced from the next circumferentially adjacent pair whereby said means in each bore will urge all of said plungers in one direction to cause said cam means to urge said detents inwardly, one pair of detents engaging a groove to lock said rod against movement in either direction, introduction of fluid pressure to said bores serving to move said cam means away from said detents and introduction of fluid pressure to either cylinder causing movement of said pistons and rod with the cam surfaces in said grooves camming said detents out of locking engagement therewith.

9. A double-acting fluid pressure actuator and locking means comprising an elongated tubular body closed at one end and having an opening in the opposite end, means on said body for attaching the same to a supporting structure, an inwardly extending elongated annular boss intermediate the length of said body having an axial aperture therethrough and dividing said body into spaced cylinders, a piston rod slidably received in said opening and aperture, a piston slidably disposed in each cylinder and fixed to said rod, sealing means to prevent the escape of fluid pressure through said opening, a fluid pressure inlet and outlet into the first cylinder at said one end of said body, a second fluid pressure inlet and outlet into the second cylinder at said opposite end of said body, said rod between said pistons having a plurality of axially spaced annular grooves therein, the walls of said grooves being beveled outwardly to provide cam surfaces, a plurality of circumferentially spaced longitudinal bores in said boss, means in each bore at said one end for urging said plungers towards the opposite ends, cam means on each plunger, a common fluid pressure inlet and outlet communicating with each bore at the ends opposite said one end, circumferentially spaced radial apertures in said boss communicating with each bore and with said axial aperture, a locking detent slidably received in each radial aperture, the inner ends of said detents being tapered for engaging said grooves and the outer ends of said detents having follower means engaging said cam means, said detents being axially spaced, whereby said means in each bore will urge all of said plungers in one direction to cause said cam means to urge said detents inwardly, at least one detent engaging a groove to lock said rod against movement in either direction, introduction of fluid pressure to said bores serving to move said cam means away from said detents and introduction of fluid pressure to either cylinder causing movement of said pistons and rod with the cam surfaces in said grooves camming said detent out of locking engagement therewith.

10. A double-acting fluid pressure actuator and locking means comprising an elongated tubular body closed at one end and having an opening at the opposite end and providing at the opposite end and providing a cylinder, means on said body for attaching the same to a supporting structure, an elongated hollow piston slidably disposed in said cylinder and dividing the same into first and second chambers, a fluid pressure inlet and outlet into said first chamber, a second fluid pressure inlet and outlet into said second chamber, a hollow piston rod fixed to said piston and extending through said opening, means to prevent the escape of fluid pressure from said second chamber through said opening, a locking bar fixed to the closed end of said body and slidably received in said piston and piston rod, packing means on the end of said bar within said piston to prevent the leakage of fluid pressure from said first chamber into said hollow piston rod, said bar having a plurality of axially spaced annular grooves therein, the walls of said grooves being beveled outwardly to provide cam surfaces, a plurality of circumferentially spaced longitudinal bores in said piston, each bore terminating at the inner end in a reduced bore, a plunger slidably received in each bore, each plunger having a reduced portion received in each reduced bore, a compression spring in each bore for urging said plungers toward the reduced bores, cam means on each plunger within said bore, a passage in said piston communicating with each reduced bore and said second chamber, circumferentially spaced radial apertures in said piston communicating with each bore and with the interior of said piston, a locking detent slidably received in each radial aperture, the inner ends of said detents being tapered for engaging said grooves and the outer ends of said detents having follower means engaging said cam means, each detent having a groove in one surface providing a communication between each bore and the interior of said piston, diametrically opposite plungers and associated detents providing operating pairs, each pair of detents being axially spaced from the next circumferentially adjacent pair a distance equal to a fraction of the distance between two axially adjacent grooves, whereby said springs will urge all of said plungers in one direction to cause said cam means to urge said detents inwardly, one pair of detents engaging a groove to lock said piston against movement in either direction with certain of the remaining pairs of detents partially engaging said last mentioned groove and the remaining pairs of detents engaging said bar between said grooves, whereby upon introduction of fluid pressure to said first chamber, such fluid pressure will flow through the interior of said piston around said bar and through said grooves into said bores to move said plungers against said springs and release said detents, or upon introduction of fluid pressure to said second chamber such fluid pressure will flow through said passages to said reduced bores to move said plungers against said springs and release said detents, and upon movement of said piston in either direction said cam surfaces in said grooves will cam said detents out of locking engagement therewith.

11. A double-acting fluid pressure actuator and locking means as defined in claim 10, in which said follower means comprises a roller.

12. A double-acting fluid pressure actuator and locking means as defined in claim 10, in which said follower means comprises a rounded nose on the outer end of each detent.

13. A double-acting fluid presure actuator and locking means as defined in claim 10, in which vent passages are provided in said piston and piston rod, said vent passages communicating with the ends of said bores opposite said reduced bores and with the atmosphere.

14. A double-acting fluid pressure actuator and locking means as defined in claim 10, in which said locking bar is polygonal in cross section.

15. A double-acting fluid pressure actuator and locking means as defined in claim 10, in which said locking bar is circular in cross section.

16. A double-acting fluid pressure actuator and locking means comprising an elongated tubular body closed at one end and having an opening at the opposite end and providing a cylinder, means on said body for attaching the same to a supporting structure, and elongated hollow piston slidably disposed in said cylinder and dividing the same into first and second chambers, a fluid pressure inlet and outlet into said first chamber, a second fluid pressure inlet and outlet into said second chamber, a hollow piston rod fixed to said piston and extending through said opening, means to prevent the escape of fluid pressure through said second chamber through said opening, a locking bar fixed to the closed end of said body and slidably received in said piston and piston rod, packing means on the end of said bar within said piston to prevent the leakage of fluid pressure from said first chamber into said hollow piston rod, said bar having a plurality of axially spaced annular grooves therein, the walls of said grooves being beveled outwardly to provide cam surfaces, a plurality of circumferentially spaced longitudinal bores in said piston, each bore terminating at the inner end in a reduced bore, a plunger slidably received in each bore, each plunger having a reduced portion received in each reduced bore, means in each bore for urging said plungers toward the reduced bores, cam means on each plunger within said bore, a passage in said piston communicating with each reduced bore and said second chamber, circumferentially spaced radial apertures in said piston communicating with each bore and with the interior of said piston, a locking detent slidably received in each radial aperture, the inner ends of said detents being tapered for engaging said grooves and the other ends of said detents having follower means engaging said cam means, each detent having a groove in one surface providing a communication between each bore and the interior of said piston, diametrically opposite plungers and associated detents providing operating pairs, each pair of detents being axially spaced from the next circumferentially adjacent pair of distance equal to a fraction of the distance between two axially adjacent grooves, whereby said means in said bores will urge all of said plungers in one direction to cause said cam means to urge said detents inwardly, one pair of detents engaging a groove to lock said piston against movement in either direction with certain of the remaining pairs of detents partially engaging said last mentioned groove and the remaining pairs of detents engaging said bar between said grooves, whereby upon introduction of fluid pressure to said first chamber such fluid pressure will flow through the interior of said piston around said bar and through said grooves in said detents into said bores to move said plungers against the means in said bores and release said detents, or upon introduction of fluid pressure to said second chamber such fluid pressure will flow through said passages to said reduced bores to move said plungers against said means in said bores and release said detents, and upon movement of said piston in either direction said cam surfaces in said grooves will cam said detents out of locking engagement therewith.

17. A double-acting fluid pressure actuator and locking means comprising an elongated tubular body closed at one end and having an opening at the opposite end and providing a cylinder, means on said body for attaching the same to a supporting structure, an elongated hollow piston slidably disposed in said cylinder and dividing the same into first and second chambers, a fluid pressure inlet and outlet into said first chamber, a second fluid pressure inlet and outlet into said second chamber, a hollow rod fixed to said piston and extending through said opening, means to prevent the escape of fluid pressure from said second chamber through said opening, a locking bar fixed to the closed end of said body and slidably received in said piston and piston rod, packing means on the end of said bar within said piston to prevent the leakage of fluid pressure from said first chamber into said hollow piston rod, said bar having a plurality of axially spaced annular grooves therein, the walls of said grooves being beveled outwardly to provide cam surfaces, a plurality of circumferentially spaced longitudinal bores in said piston, each bore terminating at the inner end in a reduced bore, a plunger slidably received in each bore, each plunger having a reduced portion received in each reduced bore, means in each bore for urging said plunger toward the reduced bores, cam means on each plunger within said bore, a passage in said piston communicating with each reduced bore and said second chamber, circumferentially spaced radial apertures in said piston communicating with each bore and with the interior of said piston, a locking detent slidably received in each radial aperture, the inner ends of said detents being tapered for engaging said grooves and the outer ends of said detents having follower means engaging said cam means, each detent having a groove in one surface providing a communication between each bore and the interior of said piston, diametrically opposite plungers and associated detents providing operating pairs, each pair of detents being axially spaced from the next circumferentially adjacent pair, whereby said means in said bores will urge all of said plungers in one direction to cause said cam means to urge said detents inwardly, one pair of detents engaging a groove to lock said piston against movement in either direction, whereby upon introduction of fluid pressure to said first chamber such fluid pressuhre will flow through the interior of said piston around said bar and through said grooves in said detents into said bores to move said plungers against said means in said bores and release said detents, or upon introduction of fluid pressure to said second chamber such fluid pressure will flow through said passages to said reduced bores to move said plungers against said means in said bores and release said detents, and upon movement of said piston in either direction said cam surfaces in said grooves will cam said detents out of locking engagement therewith.

18. A double-acting fluid pressure actuator and locking means comprising an elongated tubular body closed at one end and having an opening at the opposite end and providing a cylinder, means on said body for attaching the same to a supporting structure, an elongated hollow piston slidably disposed in said cylinder and dividing the same into first and second chambers, a fluid pressure inlet and outlet into said first chamber, a second fluid pressure inlet and outlet into said second chamber, a hollow piston rod fixed to said piston and extending through said opening, means to prevent the escape of fluid pressure from said second chamber through said opening, a locking bar fixed to the closed end of said body and slidably received in said piston and piston rod, packing means on the end of said bar within said piston to prevent the leakage of fluid pressure from said first chamber into said hollow piston rod, said bar having a plurality of axially spaced annular grooves therein, the walls of said grooves being beveled outwardly to provide cam surfaces, a plurality of circumferentially spaced longitudinal bores in said piston, each bore terminating at the inner end in a reduced bore, a plunger slidably received in each bore, each plunger having a reduced portion reecived in each reduced bore, having a reduced portion received in each reduced bore, reduced bores, cam means on each plunger within said bore, a passage in said piston communicating with each reduced bore and said second chamber, circumferentially spaced radial apertures in said piston communicating with each bore and with the interior of said piston, a locking detent slidably received in each radial aperture, the inner ends of said detents being tapered for engaging said grooves and the outer ends of said detents having follower means engaging said cam means, each detent having a groove in one surface providing a communication between said bore and the interior of said piston, said detents being axially spaced, whereby said means in said bores will urge all of said plungers in one direction to cause said cam means to urge said detents inwardly, at least one detent engaging a groove to lock said piston against movement in either direction, whereby upon introduction of fluid pressure to said first chamber such fluid pressure will flow through the interior of said piston around said bar and through said grooves in said detents into said bores to move said plungers against said means in said bores and release said detents, or upon introduction of fluid pressure to said second chamber such fluid pressure will flow through said passages to said reduced bores to move said plungers against said means in said bores and release said detents, and upon movement of said piston in either direction said cam surfaces in said grooves will cam said detents out of locking engagement therewith.

(References on following page)

References Cited by the Examiner

UNITED STATES PATENTS

| | | | |
|---|---|---|---|
| 851,277 | 4/1907 | Clark | 92—24 X |
| 1,907,944 | 5/1933 | Forbes et al. | 92—18 X |
| 2,118,890 | 5/1938 | Maes | 92—18 X |
| 2,713,328 | 7/1955 | Driskel et al. | 92—24 |
| 3,039,579 | 6/1962 | Royle et al. | 92—27 X |

MARTIN P. SCHWADRON, *Primary Examiner.*

I. C. COHEN, *Assistant Examiner.*